United States Patent [19]

Dougherty

[11] Patent Number: 4,510,611
[45] Date of Patent: Apr. 9, 1985

[54] TRANSCEIVER CIRCUIT FOR INTERFACING BETWEEN A POWER LINE COMMUNICATION SYSTEM AND A DATA PROCESSOR

[75] Inventor: John J. Dougherty, Avon, Conn.

[73] Assignee: General Electric Company, Portsmouth, Va.

[21] Appl. No.: 442,982

[22] Filed: Nov. 19, 1982

[51] Int. Cl.³ .......................... H04B 1/38; H03D 1/00
[52] U.S. Cl. .......................................... 375/8; 375/96; 340/310 A; 364/728
[58] Field of Search ...................... 340/870.18, 870.19, 340/870.21, 288, 310 R, 310 A; 343/5 DP, 378; 364/728, 824; 375/7, 8, 36, 96; 179/2 R, 2 DP, 2.51, 4

[56] References Cited

U.S. PATENT DOCUMENTS

| | | | |
|---|---|---|---|
| 3,349,374 | 10/1967 | Gabrielson et al. | 375/7 |
| 3,592,962 | 7/1971 | Matthews | 179/4 |
| 3,832,637 | 8/1974 | Alexander et al. | 179/2 DP |
| 4,161,033 | 7/1979 | Martinson | 364/824 |
| 4,253,189 | 2/1981 | Lemoussu et al. | 375/77 |
| 4,379,284 | 4/1983 | Boykin | 340/310 R |
| 4,380,009 | 4/1983 | Long et al. | 340/310 R |
| 4,429,299 | 1/1984 | Kabat et al. | 340/310 R |
| 4,446,462 | 5/1984 | Ouellette et al. | 340/310 R |

Primary Examiner—Benedict V. Safourek

[57] ABSTRACT

A transparent transceiver interface between a broadband power line communication system and a baseband data processor includes an autocorrelation receiver. The autocorrelation receiver achieves an extremely narrow bandpass function without passive elements. The receiver accepts wideband limited signals from the power line and performs an autocorrelation test over a single cycle of the carrier frequency.

14 Claims, 7 Drawing Figures

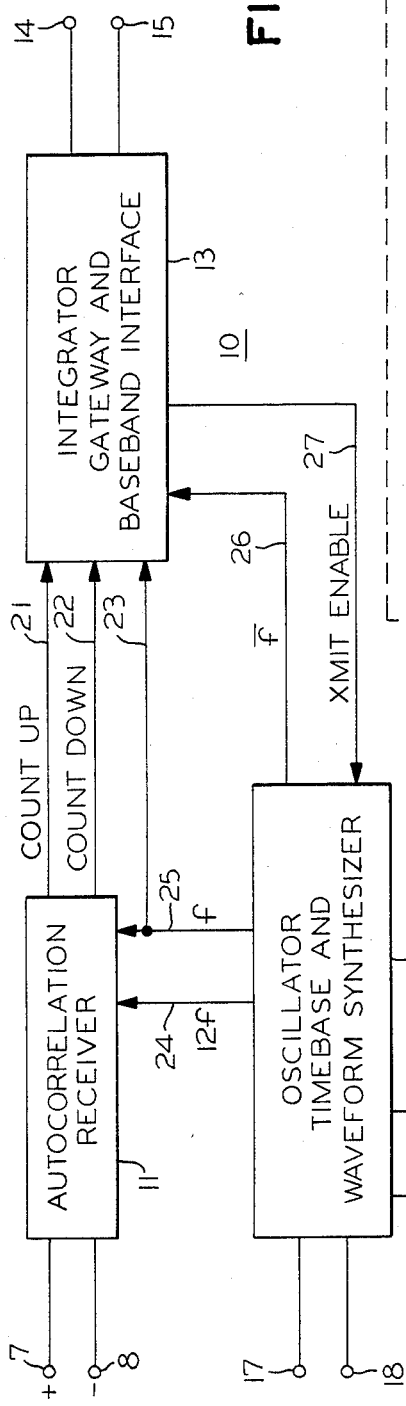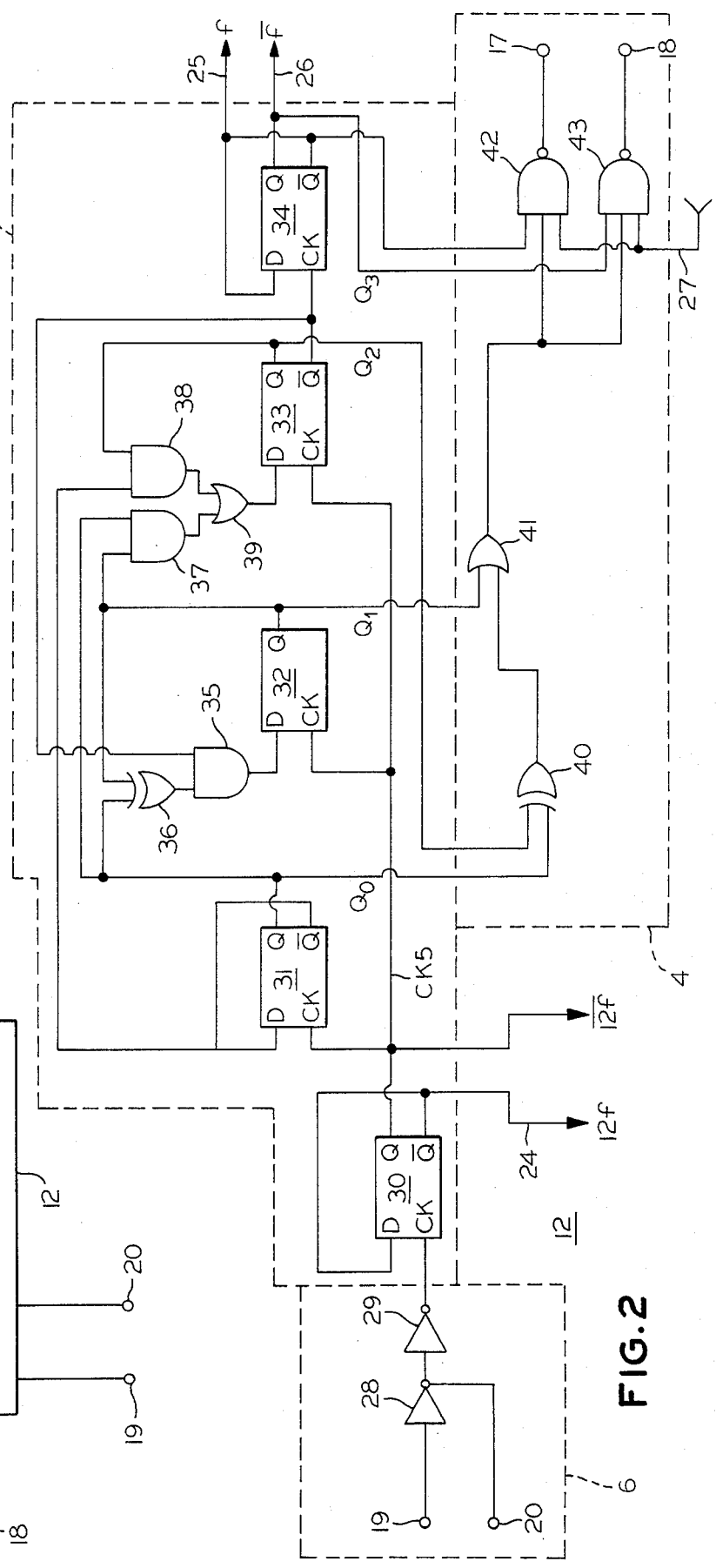

TRANSCEIVER CIRCUIT FOR INTERFACING BETWEEN A POWER LINE COMMUNICATION SYSTEM AND A DATA PROCESSOR

BACKGROUND OF THE INVENTION

This invention relates to a digital transceiver circuit for interfacing between a source of broadband signals and a source of baseband signals in a communication system and more particularly to such a system employing amplitude shift keying as a means of modulating the broadband and an autocorrelation receiver for demodulating the broadband. Some U.S. patents employing correlation techniques are as follows.

U.S. Pat. No. 4,064,361 to Kustka et al. employs an autocorrelation test for the purpose of providing the timing recovery of an incoming wave which may be altered by phase or amplitude modulation. A narrow bandpass filter is required with the circuit to filter the harmonics of the incoming wave signal.

U.S. Pat. No. 4,253,189 to Lemoussu et al. employs an autocorrelation technique to generate a phase locked local carrier which is used to demodulate the carrier in a conventional manner. Both Kustka et al. and Lemoussu et al. require additional filters for removing the harmonics from the incoming wave signal.

U.S. Pat. No. 4,038,540 to Roberts discloses detecting an ASK modulated broadband signal and employs a digital correlation technique to detect the presence or absence of carrier. Roberts however, does not suggest the use of a correlation technique on the signal itself over a specified frequency interval.

The purpose of this invention is to employ an autocorrelation circuit within a receiver to perform a correlation on an incoming signal with itself over a specified frequency interval for demodulation purposes. This technique allows the receiver to be fully implemented by integrated circuit techniques since discrete filter circuit elements are not required.

SUMMARY OF THE INVENTION

An autocorrelation receiver is employed within a transparent transceiver interface bewteen a power line data bus and a microprocessor. Logic circuits are included to provide gateway switching between transmit and receive functions. An oscillator block utilizes external elements and counters to generate control pulses for all the other blocks within the transceiver. A digital integrator block averages the receiver outputs over the required state recognition time.

BRIEF DESCRIPTION OF THE DRAWINGS

FIG. 1 is a circuit diagram of the transceiver according to the invention;

FIG. 2 is a circuit representation of the transmitter block within the transceiver shown in FIG. 1;

GENERAL DESCRIPTION OF THE INVENTION

Figure 5:
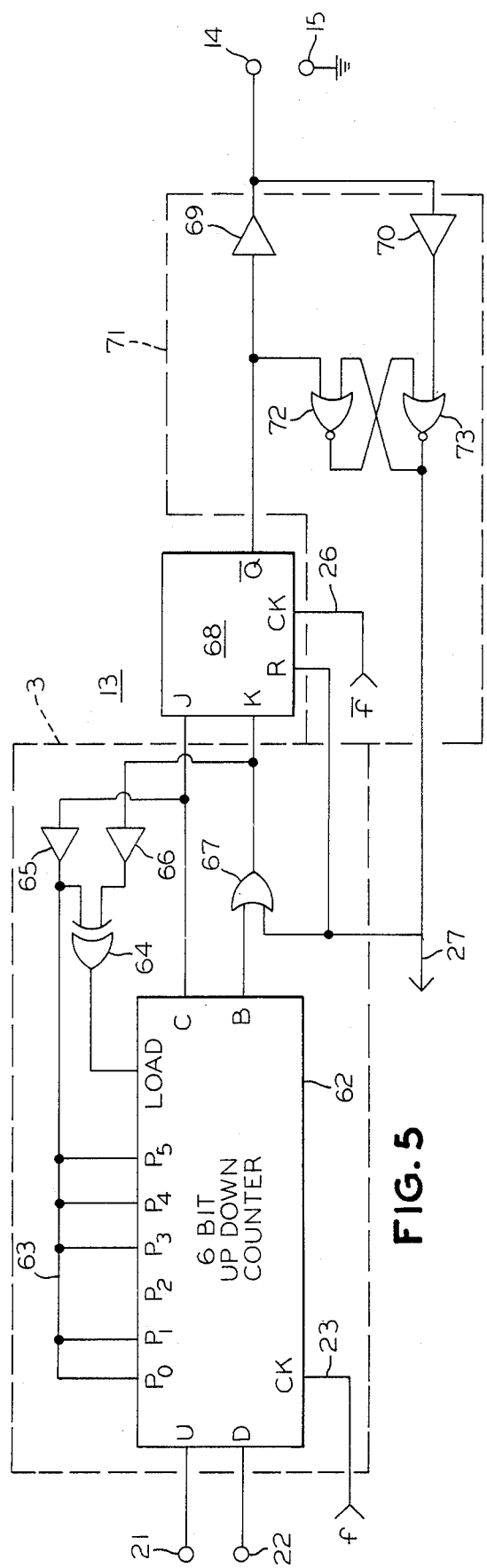
FIG. 5 is a circuit representation of the interface circuit within the transceiver shown in FIG. 1.

Transceiver 10 shown in FIG. 1, utilizes a receiver block 11, transmitter block 12, and an interface block 13 to connect with a power line data bus employing amplitude shift keying (ASK) modulation of broadband signals and a data processing bus which contains baseband signals. The arrangement of interface block 13 between receiver 11 and transmitter 12 allows transceiver 10 to operate in a transparent manner. "Transparency", for purposes of this disclosure, is defined to mean no significant time delay between the input of the carrier modulated data and the output of the baseband data and vice versa. As described within U.S. patent applications Ser. Nos. 231,631 and 231,632, means are provided for communicating over the neutral and ground conductors of a power line communication system. These applications are incorporated herein for purposes of reference. As described earlier, the employment of ASK modulation on the power data bus simplifies the circuitry involved for providing a transparent transceiver to interface with the baseband signals on the data processor bus. In simplistic terms, ASK is similar to baseband when the ASK broadband carrier is modulated by the baseband signals. Transceiver 10, by employing an autocorrelation receiver without L or C filters, can be readily implemented by metal or silicon gate complimentary metal oxide semiconductor (CMOS) integrated circuit techniques. The implementation of transceiver 10 in a single integrated circuit chip greatly facilitates the use of a plurality of transceivers on the power data bus wherein each power outlet on the bus can have one or more transceivers to control the operation of any electrical apparatus connected to the corresponding outlet.

DESCRIPTION OF THE PREFERRED EMBODIMENT

The Transceiver

Transceiver 10 shown in FIG. 1 wherein receiver 11 and transmitter 12 are interconnected by means of an interface circuit block 13, is connected to any two power line conductors of a three wire power bus by means of a positive input 7 and a negative input 8 connecting with receiver 11. The connection between transceiver 10 and a data processor communication bus is made by connections with terminals 14 and 15 connecting with interface 13. The output of transceiver 10 is connected to the selected two wires of the power bus by means of terminal 17 and 18 connected with transmitter 12. As will be discussed below in greater detail, a first oscillator terminal 19 and a second oscillator terminal 20 are employed to provide external clock signals to transceiver 10 by means of connection with transmitter 12. Receiver 11 is connected with interface 13 by means of a count-up connector 21 and a count-down connector 22. Connection between transmitter 12 and interface 13 is made in one direction by means of f̄ connector 26 and in an opposite direction by means of transmitter enable connector 27. Connection between transmitter 12 and receiver 11 is made by means of connector 24, and f connector 25, respectively. Further connection between transmitter 12 and interface 13 is made by connector 23 and connector 25. Receiver 11 comprises an autocorrelation receiver which achieves extemely narrow bandpass function without passive circuit elements such as inductors and capacitors which are difficult to provide in an integrated circuit chip. Interface circuit block 13 contains an integrator, gateway and baseband interface function. The integrator block averages the receiver outputs over an integral number of carrier cycles which equals the required state recognition time. The states involved for purposes of this disclosure are "supreme state" and "non-supreme state". Gateway function is similar to the steering function employed in state of the art digital communication systems. Transmitter 12 includes an oscillator, time base as well as a waveform synthesizer. External timing elements and counters are connected to transmitter 12 by means of first oscillator terminal 19 and second oscillator terminal 20 to generate control pulses for use with both the receiver and interface blocks, 11, 13.

The Transmitter

Figure 3B:
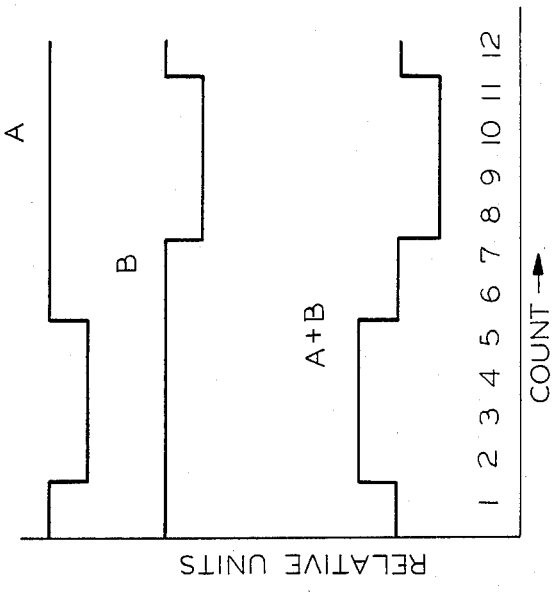
FIG. 3B is a graphic representation of the waveforms applied to the output terminals of the transmitter circuit depicted in FIG. 2.
Figure 3A:
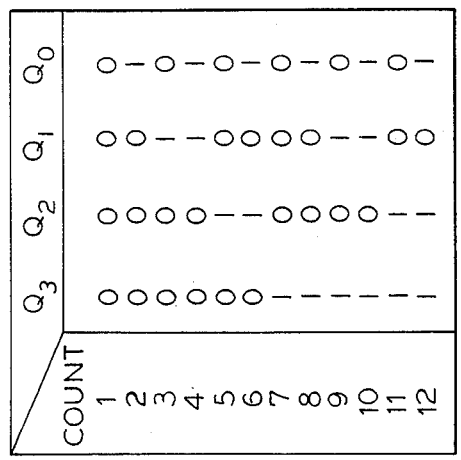
FIG. 3A is a diagramatic representation of the counter truth table for the flip-flops used within the circuit shown in FIG. 2.

The transmitter circuit 12 is shown in FIG. 2 wherein an external oscillator which must generate 24 times the intended carrier frequency of the power data bus, is connected via terminals 19, 20, to a pair of inverters 28, 29, to complete the oscillator block portion 6 of the transmitter. If a low cost TV color burst crystal having a 3.58 mhz is used, the carrier frequency is 149 khz. A ceramic resonator or a trimmed RC circuit may also be suitable for producing the time base frequency. The oscillator signal is inserted within the time base block 5 of the transmitter which consists of a flip-flop 30 wherein the oscillator signal is divided by two. The divided signal is designated 12$f$ and is applied to receiver 11 by means of connector 24. Three flip-flops 31-33, are connected by a common clock bus CK5. Flip-flops 31-33 function as a synchronous divide-by-six counter and flip-flop 34 functions as a divide-by-two counter. The inputs of Exclusive OR gate 36 are directly connected to the Q terminals of flip-flops 31, 32 and the output of Exclusive OR gate 36 is connected to one of the inputs of AND gate 35. The output of AND gate 35 is connected to the D terminal of flip-flop 32. The other input of AND gate 35 is connected between the $\overline{Q}$ terminal of flip-flop 33 and the clock terminal of flip-flop 34. The inputs of Exclusive OR gate 36 are connected across the inputs to AND gate 37 and the output of AND gate 37 is connected to one of the inputs of OR gate 39. The inputs of AND gate 37 are also connected in common with the Q terminal of flip-flop 31 and one of the inputs of exclusive OR gate 40. One input of AND gate 38 is connected in common with the D and $\overline{Q}$ terminals of flip-flop 31. The other input of AND gate 38 is connected in common with the Q terminal of flip-flop 33 and the other input of Exclusive OR gate 40. The outputs of both AND gates 37, 38 are connected to the inputs of OR gate 39 and the output of OR gate 39 is connected to the D terminal of flip-flop 33. Gates 35-39 present the "next" state for the synchronous counter function of flip-flops 31-33. One input to OR gate 41 is connected to the Q terminal of flip-flop 32 and to a common point between one input to Exclusive OR gate 36 and AND gate 37. The other input to OR gate 41 is connected to the output of Exclusive OR gate 40. The D-$\overline{Q}$ terminals of divide-by-two flip-flop 34 are connected to receiver 11 (FIG. 1) by means of connector 25 and is the carrier frequency used by the receiver as a "dump signal". The waveform synthesizer sub-circuit of transmitter 12 comprises the arrangement of Exclusive OR gate 40, OR gate 41 and NAND gates 42, 43. Terminal D of flip-flop 34 is connected in common with the $\overline{Q}$ terminal of flip-flop 34 and to one of the inputs of NAND gate 42. The center input terminal of NAND gate 42 is connected in common with the center input terminal of NAND gate 43 and the output of OR gate 41. One input terminal of NAND gate 43 is connected to the Q terminal of flip-flop 34 and to connector 26. The other inputs of NAND gates 42 and 43 are connected together and to connector 27 which comprises the transmitter enable connector between interface 13 and transmitter 12 shown in FIG. 1. Output 17 of NAND gate 42 and output 18 of NAND gate 43 comprise the output terminals for transmitter 12 for connection to the power data bus. Gates 40-43 use the special divide-by-twelve signal ($Q_0$, $Q_1$, $Q_2$, $Q_3$,) to perform a simple waveform synthesis function and transmit. The table for signals $Q_0$-$Q_3$ is shown in FIG. 3A as a function of count number. The output waveforms appearing across outputs 17, 18, are shown in FIG. 3B for each count number indicated. Waveform A appears at terminal 17 and waveform B appears at output terminal 18. Waveform (A+B) represents the synthesized waveform which is applied to the power data bus.

The synthesized waveform (A+B) differs from a square wave in several respects. The fundamental component is reduced by 13.4% and the total RMS value is reduced by 19%. A very important feature is that the third harmonic is eliminated along with all other triplen harmonics. No even harmonics are produced, and all other odd harmonics are reduced by 13.4% which tracks the fundamental. The total harmonic distortion is reduced from 47% down to 31%. The harmonic elimination provided by this combination of elements is an important feature of this invention.

The Receiver

Figure 4:
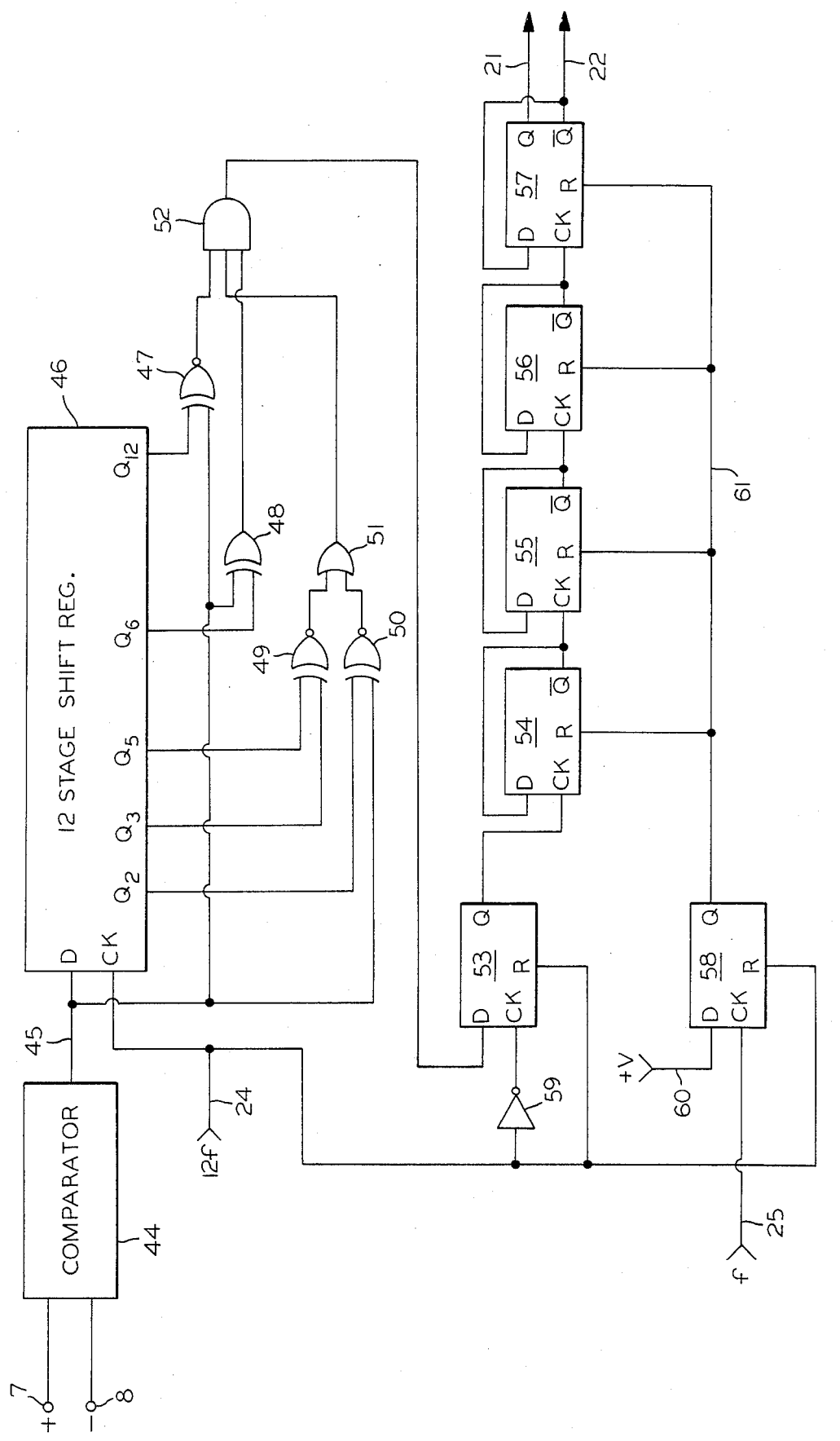
FIG. 4 is a circuit representation of the receiver block within the transceiver shown in FIG. 1.

The receiver 11 is shown schematically in FIG. 4 and comprises an autocorrelation receiver circuit. It is highly advantageous to fabricate the transceiver 10 shown in FIG. 1 in integrated circuit form. The autocorrelation receiver makes this possible since the receiver components lend themselves to both metal and silicon gate CMOS integrated circuit techniques although other processes such as linear, NMOS or discrete circuitry can also be employed. Since correlation is used to reject noise, no AGC circuits, variable thresholds, or sharply tuned LC filters which can cause noise "smearing" are necessary. Inputs 7, 8, are connected with the power data bus and are processed through an analog comparator latch 44 which samples the incoming signal and outputs a binary signal (+V or 0) that corresponds to the input signal polarity. Comparator 44 is a zero threshold device providing an input through connector 45 to a twelve-stage shift register 46 wherein the output signal from the comparator is sampled at twelve times the system carrier frequency. Gates 47-52 are interconnected with shift register 46 to make a correlation test having the following form.

$$Rxx(t) = \overline{x(t) \oplus x(t-T)} \cdot$$
$$\overline{(x(t) \oplus x(t-T/2)} \cdot$$
$$(\overline{x(t) \oplus x(t-T/6)} + \overline{x(t-T/4) \oplus x(t-5/12T)})$$

The first term to the right of the equation is the basic frequency correlation test. The second term will reject all low frequencies and even harmonics such as the 2nd, 4th, etc. of the carrier frequency, both of which would not be rejected by the first term. The last term will reject all harmonics which are a multiple of three times the carrier frequency such as the 3rd, 9th, 15th, etc. The resultant test will be true for frequencies near the carrier frequency and near odd non-triplen (5th, 7th, 11th, etc.) harmonics. Thus, the gates 48–52 constitute a digital filter. The band around the carrier frequency is a function of the number of samples per carrier frequency. Selecting a number greater or less than 12 would narrow or widen the band.

The comparator output, which is connected to the D terminal of shift register 46 by means of connector 45, is also connected to one of the inputs of each Exclusive NOR gates 47 and 50, and Exclusive OR gate 48. The remaining inputs are connected to terminals $Q_{12}$, $Q_6$ and $Q_2$ on shift register 46. Terminals $Q_3$ and $Q_5$ are connected with the inputs to Exclusive NOR gate 49 and the output of Exclusive NOR gate 49 is connected to one of the inputs of OR gate 51. The output of Exclusive NOR gate 50 is connected to the other input of OR gate 51 and the output of OR gate 51 is connected to the center input terminal of AND gate 52. The first input terminal of AND gate 52 is connected to the output of Exclusive NOR gate 47 and the third input to AND gate 52 is connected to the output of Exclusive OR gate 48. The averaging circuit of receiver 11 consists of the combination of flip-flops 53–58 and inverter 59.

The averaging circuit is achieved by sampling the output of the autocorrelation circuitry 12 times per carrier frequency cycle generated at 53. When the autocorrelation test is "true", a signal is applied to a 4 bit counter (54–57). After twelve samples, a "count-up" (21) to "count-down" (22) signal is sent to the Integrator section shown at 13 in FIG. 1. A "count-up" only occurs if the autocorrelation output is "true" for 8 or more of the twelve samples. Clearly, this number can be changed dynamically or statically by the addition of logic circuitry to test the count after twelve samples.

After the "count-up" or "count-down" signal is sent to the Integrator, a common reset signal is applied to the counter flip-flops, 54–57.

Clocking pulse 12$f$ is provided by connector 24 from the time base CK5 of transmitter 12 in FIG. 2 to the clock terminal of shift register 46, to the input of inverter 59, and to the R terminals of flip-flops 53 and 58. Clocking pulse f is provided from the time base CK5 of transmitter 11 by connection between connector 25 and the clock terminal of flip-flop 58. Power input is supplied at terminal 60 which comprises the D terminal of flip-flop 58. The output of inverter 59 is connected with the clock terminal of flip-flop 53 and the output of AND gate 52 is connected with the D terminal of flip-flop 53. Flip-flops 54–57 function as a 4 bit ripple counter. The D and $\overline{Q}$ terminals of flip-flop 54 are connected in commonn with the clock terminal of flip-flop 55. The D and $\overline{Q}$ terminals of flip-flop 55 are connected in common with the clock terminal of flip-flop 56. The D and $\overline{Q}$ terminals of flip-flop 56 are connected in common with the clock terminal of flip-flop 57. The D and $\overline{Q}$ terminals of flip-flop 57 are connected in common to connector 22 which comprises the count-down connection between the receiver 11 and interface 13 of FIG. 1. The count-up connector between receiver 11 and interface 13 is connected with terminal Q of flip-flop 57. The receiver circuit is completed by the common R connection 61 between flip-flops 54–57 and the Q terminal of flip-flop 58.

The Interface Circuit

Figure 6:
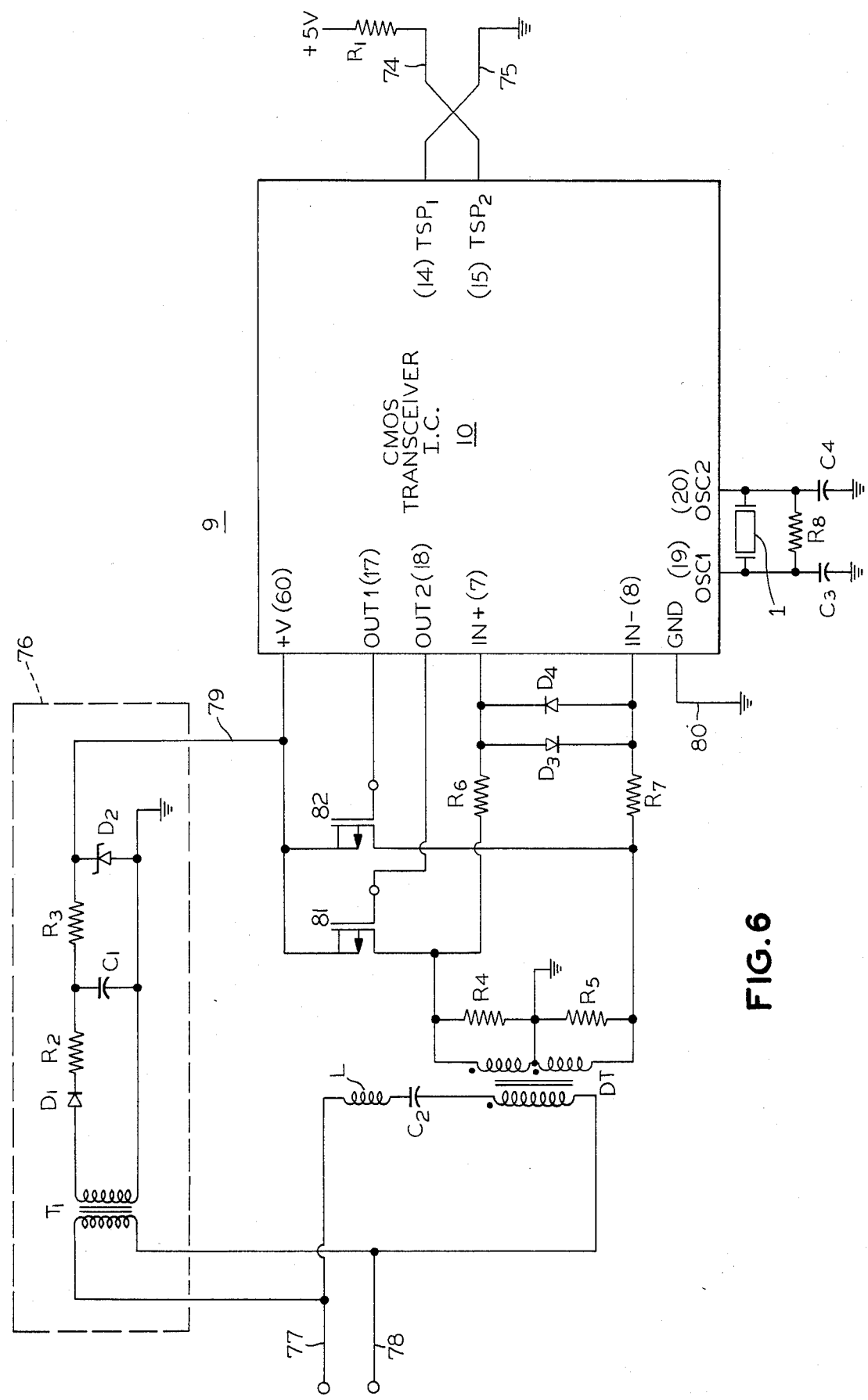
FIG. 6 is a block diagram of the transceiver shown in FIG. 1 including a power supply circuit and power line connections.

The schematic for interface 13 is shown in FIG. 5 wherein the count-up and count-down connectors 21, 22 from receiver 11 (FIG. 1) are inputted to a six bit up-down counter 62 at terminals U and D respectively. Terminals $P_0$–$P_5$ are connected together by means of connector 63 and are connected in common to one of the inputs of gate 64 and to the ouput of buffer stage 65. The output of gate 64 is connected to the load terminal of six bit counter 62. The other input of gate 64 is connected to the output of buffer stage 66. The input of buffer 65 is connected in common with the C terminal of six bit counter 62 and the J terminal of flip-flop 68. The input of open collector stage 66 is connected in common with the output of OR gate 67 and the K terminal of flip-flop 68. One input of OR gate 67 is connected with the B terminal of counter 62 and the other input of OR gate 67 is connected in common with the R terminal of flip-flop 68 and connector 27 which comprises the transmitter enable connector shown connecting with transmitter 12 in FIG. 1. The input connector 26 which provides $\bar{f}$ clock pulses to interface 13 is connected to the clock terminal of flip-flop 68. The steering logic between terminals 14, 15 which connect with the twisted pair line 74,75 shown in FIG. 6 is provided by gateway 71. The common connection between the $\overline{Q}$ terminal of flip-flop 68 and the input of open collector stage 69 is connected to one of the inputs of NOR gate 72. The output of open collector stage 69 is connected in common with terminal 14 and with the input terminal to buffer stage 70. The output of buffer stage 70 is connected to one of the inputs of NOR gate 73 and the other input of NOR gate 73 is connected to the output of NOR gate 72. The other input of NOR gate 72 is connected to the output of NOR gate 73 and to transmitter enable connector 27. The integrater stage 3 of interface circuit 13 consists of the six bit counter 62 which is a re-settable synchronous up-down counter. Count-up and count-down signals are clocked into counter 62 once every cycle of the carrier frequency f. When the count reaches "64" a 'carry' is generated at terminal (C). When the count passes "0" a "borrow" is generated at terminal (B). When either of these signals occur, the following two functions are implemented. First, a load signal is sent to pre-set up-down counter 62 to "63" for a carry or "0" for a borrow. By this means, the integrator circuit portion consisting of 6 bit counter 62 is clamped on overflows in either direction. The state register, which comprises J-K flip-flop 68, becomes clocked by signal $\bar{f}$ to a carry (supreme) or borrow (non-supreme) state. The clocking occurs once per carrier cycle such that if neither a carry nor a borrow is generated by the integrator, the state register remains in its last state. This provides a hysteresis function for full range of state recognition. The length of time to clock the up-down counter 62 through its full count sets the state recognition time. For six bits, state recognition time is 64 times the carrier wave length or 430 microseconds. This is suitable for a one thousand baud (average) system in which the minimum symbol length (one) is 666 microseconds. Slower baud rates require larger up-down counters. The output appears at terminal $\overline{Q}$ of the state register. Flip-flop 68 is buffered through open collector stage 69 which can comprise an open drain N-driver, onto the baseband medium, twisted pair line 74, 75 of FIG. 6 to achieve the supreme state pulldown function. The output of flip-flop 68 is also applied to gateway 71 by connection with one of the inputs to NOR gate 72. The combination of NOR gates 72, 73 comprise an R-S flip-flop. One input to NOR gate 73 is provided through buffered signal open collector 70 from baseband terminal 14. In operation, the R-S flip-flop will latch to the first input, i.e. to open collector 69 or open collector 70, that goes "low". If the state register, flip-flop 68, senses a supreme state before the signal appearing on terminal 14 to open collector 70 goes to the low state, gateway 71 will remain in the receive mode such that the signal on transmitter enable connector 27 is "0". If a supreme state first occurs on twisted pair terminal 14, a "1" appears on transmit enable connector 27 and the transmit mode is entered. With no supreme present, gateway 71 is in the receive mode.

The Integrated Circuit Implementation

When transceiver 10 of FIG. 1 is implemented in an integrated circuit chip, the integrated circuit implementation block diagram 9 is as shown in FIG. 6 wherein integrated circuit 10 is displayed as a CMOS integrated circuit. Connections are made via terminals V+, out1, out2, in+, in-, oscillator 1, oscillator 2, TSP 1 and TSP 2. The corresponding previous circuit references are 60, 17, 18, 7, 8, 19, 20, 14 and 15 respectively. A power supply circuit 76, is connected to power line conductors 77, 78 through transformer $T_1$ linear diode $D_1$, resistors $R_2$, $R_3$, capacitor $C_1$ and zener diode $D_2$, produces 10 volts DC to terminal 60 via power supply conductor 79. Outputs 1 and 2 (17, 18) are connected through a pair of P-channel MOSFET drivers, 81, 82 resistor $R_4$ and one side of differential transformer DT, back through power line conductors 77, 78 to the power data bus. Input signal is applied to inputs in+, in- (7, 8) from power line conductors 77, 78 through series tank circuit L, $C_2$, differential transformer DT, resistors $R_5$, $R_6$, $R_7$ and back to back diodes $D_3$ and $D_4$. Ground connection is made by means of ground connector 80. Incoming clock signals are provided at $OSC_1$ and $OSC_2$ (19, 20) by means of a 3.5 mhz oscillator 1 which can comprise a TV color burst crystal as described earlier or by means of a trimmed RC circuit consisting of resistor $R_8$ and capacitors $C_3$, $C_4$. Connections with twisted pair line conductors 74, 75 to the data processor bus are made at $TPS_1$ and $TSP_2$. A source of +5 volts is applied to register $R_1$ on twisted pair line 74 to provide the supreme state voltage as is well known in the data processing field wherein a plurality of data processor devices such as microprocessors and computers are all connected to a common twisted pair.

Having thus described my invention, what I claim as new and desire to secure by Letters Patent is:

1. A transceiver for connection between a power line and a data processing bus in a power line communication system employing amplitude shift keying modulation of broadband signals on the power line and baseband signals on the data processing bus, said transceiver comprising:

an autocorrelation receiver connectable to said power line for receiving amplitude shift keyed signals of a carrier frequency signal, said autocorrelation receiver including digital autocorrelation means for providing an output indicative of the detection of said carrier frequency signal, digital filter means connected to said digital autocorrelation means for rejecting detected harmonics of said carrier signal in the output of said digital autocorrelation means, sampling means connected to the output of said digital filter means for sampling the output thereof at a rate which is an integral multiple of said carrier frequency signal, and digital averaging means connected to the output of said sampling means for averaging the output thereof over one period of said carrier frequency signal;

a transmitter connectable to said power line for transmitting an amplitude shift keyed signal in response to an enable signal, said transmitter including digital wave synthesizer means for generating a digital apporximation of said carrier frequency signal having minimal harmonic content; and an interface circuit connected to receive the output of said averager means and connectable to provide an output at baseband to said data processing bus and receive an input at baseband from said data processing bus to generate said enable signal, said interface circuit including digital integrator means connected to the output of said digital averager means for integrating the output of said digital averager means over a substantial portion of an amplitude shift keying period to produce baseband signals, and gateway means connected to the output of said digital integrator means and connectable to said data processing bus for supplying baseband signals to said data processing bus and for receiving baseband signals from said data processing bus, said gateway means generating said enable signal in response to baseband signals from said data processing bus and in the absence of baseband signals from said digital integrator means.

2. The transceiver of claim 1 further comprising time base generator means comprising:

clock signal input means for providing a clock signal having a frequency which is a multiple of the frequency of said carrier frequency signal;

sampling rate means responsive to said clock signal input means for deriving shift and sampling signals for said digital autocorrelation means and said sampling means in said autocorrelation receiver; and divider means connected to the output of said sampling rate means for providing an output at the frequency of said carrier frequency signal to said digital averager means in said autocorrelation receiver and said digital integrator means in said interface circuit, said divider means further providing said output at the frequency of said carrier frequency signal and outputs at multiple frequencies thereof to said digital wave synthesizer means in said transmitter.

3. The transceiver of claim 2 wherein said divider means in said time base generator means receives a signal twelve times the frequency of said carrier frequency signal, said divider means comprising a divide-by-twelve digital divider.

4. The transceiver of claim 3 wherein said digital wave synthesizer means comprises logic gate means connected to said divide-by-twelve digital divider for combining count down signals therefrom to synthesize a waveform approximating the waveform of said carrier frequency signal.

5. The transceiver of claim 2 wherein said digital autocorrelation means comprises:

threshold comparator means connectable to said power line for providing an output x(t) corresponding to the polarity of an input amplitude keyed signal;

shift register delay means connected to the output of said threshold comparator means and responsive to the shift signals from said sampling rate means for providing a delayed output of x(t-T) corresponding to one period of the frequency of said carrier frequency signal; and exclusive OR means having inputs connected to the output of said threshold comparator means and the output of said shift register delay means for providing an autocorrelation output having the logical function $\overline{x(t) \oplus x(t-T)}$.

6. The transceiver of claim 5 wherein said digital filter means comprises:

second exclusive OR means having inputs connected to the output of said threshold comparator means and an intermediate output of said shift register delay means providing a delayed output of x(t−T/2) for providing an output corresponding to the function $x(t) \oplus x(t-T/2)$; and AND means for logically combining the outputs of said first and second exclusive OR means and providing an output to said sampling means.

7. The tranceiver of claim 6 wherein said divider means in said time base circuit receives a signal twelve times the frequency of said carrier frequency signal, said divider means comprising a divide-by-twelve digital divider, said shift register delay means comprising a twelve stage shift register, and said digital filter means further comprises:

third exclusive OR means having inputs connected to intermediate outputs of said shift register delay means providing delayed outputs of x(t−T/4) and x(t−5T/12) for providing an output corresponding to the function $\overline{X(t-T/4) \oplus x(t-5T/12)}$;

fourth exclusive OR means having one input connected to the output of said threshold comparator means and another input connected to an intermediate output of said shift register delay means providing a delayed output of x(t−T/6) for providing an output corresponding to the function $\overline{x(t) \oplus x(t-T/6)}$; and OR means having inputs connected to the outputs of said third and fourth exclusive OR means and an output connected to a third input of said AND means.

8. The transceiver of claim 2 wherein said digital integrator means in said interface circuit comprises:

up-down counter means responsive to the output of said divider means for counting up or down depending on the output of said digital averger means;

logic means connected to the output of said up-down counter means for detecting when said up-down counter means counts up to a maximum count or down to a minimum count and for preloading said up-down counter means so that it will not count up past said maximum count nor down past said minimum count; and state means connected to the output of said up-down counter means for providing an output to said gateway means indicative of the output of said up-down counter means.

9. An autocorrelation receiver for connection between a power line and a data processing bus in a power line communication system employing amplitude shift keying modulation of broadband signals on the power line and base band signals on the data processing bus, said autocorrelation receiver comprising:

digital autocorrelation means connectable to said power line for receiving amplitude shift keyed signals of a carrier frequency signal and providing an output indicative of the detection of said carrier frequency signal;

digital filter means connected to said digital autocorrelation means for rejecting detached harmonics of said carrier signal in the output of said digital autocorrelation means;

sampling means connected to the output of said digital filter means for sampling the output thereof at a rate which is an integral multiple of said carrier frequency signal; and digital averaging means connected to the output of said sampling means for averaging the output thereof over one period of said carrier frequency signal.

10. The receiver of claim 9 further comprising time base generator means comprising:

clock signal input means for providing a clock signal having a frequency which is a multiple of the frequency of said carrier frequency signal;

sampling rate means responsive to said clock signal input means for deriving shift and sampling signals for said digital autocorrelation means and said sampling means; and divider means connected to the output of said sampling rate means for providing an output at the frequency of said carrier frequency signal to said digital averager means.

11. The receiver recited in claim 10 wherein said digital autocorrelation means comprises:

threshold comparator means connectable to said power line for providing an output x(t) corresponding to the polarity of an input amplitude shift keyed signal;

shift register delay means connected to the output of said threshold comparator means and responsive to the shift signal from said sampling rate means for providing a delayed output of x(t−T) corresponding to one period of the frequency of said carrier frequency signal; and exclusive OR means having inputs connected to the output of said threshold comparator means and the output of said shift register delay means for providing an autocorrelation output having the logical function $\overline{x(t) \oplus x(t-T)}$.

12. The receiver recited in claim 11 wherein said digital filter means comprises:

second exclusiver OR means having inputs connected to the output of said threshold comparator means and an intermediate output of said shift register delay means providing a delayed output of x(t−T/2) for providing an output corresponding to the function $x(t) \oplus x(t-T/2)$; and AND means for logically combining the outputs of said first and second exclusiver OR means and providing an output to said sampling means.

13. The receiver recited in claim 12 wherein said divider means in said time base generator means receives a signal twelve times the frequency of said carrier frequency signal, said divider means comprising a divide-by-twelve digital divider, said shift register delay means comprising a twelve stage shift register, and said digital filter means further comprises: third exclusive OR means having inputs connected to intermediate outputs of said shift register delay means providing delayed outputs of $x(t-T/4)$ and $x(t-5T/12)$ for providing an output corresponding to the function $x(t-T/4) \oplus x(t-5T/12)$;

fourth exclusive OR means having one input connected to the output of said threshold comparator means and another input connected to an intermediate output of said shift register delay means providing a delayed output of $x(t-T/6)$ for providing an output corresponding to the function $x(t) \oplus x(t-T/6)$; and OR means having inputs connected to the outputs of said third and fourth exclusive OR means and an output connected to a third input of said AND means.

14. The receiver recited in claim 9 further comprising digital integrator means connected to the output of said digital averager means for integrating the output of said digital averager means over a substantial portion of an amplitude shift keying period to produce baseband signals.

* * * * *